(12) United States Patent
Hodge

(10) Patent No.: US 12,395,694 B2
(45) Date of Patent: *Aug. 19, 2025

(54) CONTROLLED ENVIRONMENT MEDIA AND COMMUNICATION SYSTEM

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,238

(22) Filed: Oct. 30, 2023

(65) Prior Publication Data

US 2024/0146995 A1    May 2, 2024

Related U.S. Application Data

(60) Continuation of application No. 17/547,861, filed on Dec. 10, 2021, now Pat. No. 11,871,073, which is a
(Continued)

(51) Int. Cl.

| | |
|---|---|
| *H04N 21/436* | (2011.01) |
| *H04L 65/1059* | (2022.01) |
| *H04L 65/1069* | (2022.01) |
| *H04L 65/611* | (2022.01) |
| *H04L 65/612* | (2022.01) |

(Continued)

(52) U.S. Cl.
CPC ... *H04N 21/43615* (2013.01); *H04L 65/1059* (2013.01); *H04L 65/1069* (2013.01); *H04L 65/611* (2022.05); *H04L 65/612* (2022.05); *H04N 7/141* (2013.01); *H04N 7/147* (2013.01); *H04N 21/44218* (2013.01); *H04N 21/4882* (2013.01); *H04L 65/403* (2013.01); *H04N 21/6543* (2013.01)

(58) Field of Classification Search
CPC ............ H04N 21/43615; H04L 65/612; H04L 65/611; H04L 65/1059
See application file for complete search history.

(56) References Cited

U.S. PATENT DOCUMENTS

| | | |
|---|---|---|
| 6,734,900 B2 | 5/2004 | Mayhew |
| 6,810,527 B1 | 10/2004 | Conrad et al. |

(Continued)

FOREIGN PATENT DOCUMENTS

WO    WO 2013/096944 A1    6/2013

OTHER PUBLICATIONS

Copyright Registration Record for "iPhone: The Missing Manual," 6th ed., 2012; 1 page.
(Continued)

*Primary Examiner* — Amal S Zenati
(74) *Attorney, Agent, or Firm* — Sterne, Kessler, Goldstein & Fox P.L.L.C.

(57) ABSTRACT

The Controlled Environment Media And Communication System delivers communications services to residents of controlled facilities using a common network architecture. Some of the communications capabilities of the Controlled Environment Media And Communication System include media distribution, video visitation, intra-facility messaging, and other such communications services.

14 Claims, 4 Drawing Sheets

Related U.S. Application Data continuation of application No. 16/866,076, filed on May 4, 2020, now Pat. No. 11,202,120, which is a continuation of application No. 16/246,101, filed on Jan. 11, 2019, now Pat. No. 10,645,443, which is a continuation of application No. 15/603,095, filed on May 23, 2017, now Pat. No. 10,182,254, which is a division of application No. 15/148,880, filed on May 6, 2016, now abandoned.

(51) Int. Cl.
    *H04N 7/14*        (2006.01)
    *H04N 21/442*      (2011.01)
    *H04N 21/488*      (2011.01)
    *H04N 21/6543*     (2011.01)
    *H04L 65/403*      (2022.01)

(56) References Cited

U.S. PATENT DOCUMENTS

| | | |
|---|---|---|
| 7,027,659 B1 | 4/2006 | Thomas |
| 7,911,513 B2 | 3/2011 | Garrison et al. |
| 8,537,981 B1 | 9/2013 | Cyriac et al. |
| 8,832,374 B1 | 9/2014 | Schaefers |
| 8,917,848 B2 | 12/2014 | Torgersrud et al. |
| 8,929,525 B1 | 1/2015 | Edwards |
| 9,083,850 B1 | 7/2015 | Higgs |
| 9,106,789 B1 | 8/2015 | Shipman, Jr. et al. |
| 9,332,014 B2 | 5/2016 | Keiser et al. |
| 9,485,110 B2 | 11/2016 | Kim et al. |
| 9,674,198 B1 | 6/2017 | Hodge |
| 9,973,810 B2 | 5/2018 | Hodge |
| 10,182,254 B2 | 1/2019 | Hodge |
| 10,645,443 B2 | 5/2020 | Hodge |
| 11,202,120 B2 | 12/2021 | Hodge |
| 2003/0126267 A1 | 7/2003 | Gutta et al. |
| 2004/0172652 A1 | 9/2004 | Fisk et al. |
| 2005/0022229 A1 | 1/2005 | Gabriel et al. |
| 2006/0280177 A1 | 12/2006 | Gupta et al. |
| 2008/0201158 A1* | 8/2008 | Johnson .................. G10L 15/26 705/1.1 |
| 2009/0013359 A1 | 1/2009 | Butler et al. |
| 2009/0240586 A1 | 9/2009 | Ramer et al. |
| 2010/0094878 A1 | 4/2010 | Soroca et al. |
| 2011/0065419 A1 | 3/2011 | Book et al. |
| 2011/0237221 A1 | 9/2011 | Prakash et al. |
| 2011/0249073 A1 | 10/2011 | Cranfill et al. |
| 2011/0307548 A1 | 12/2011 | Fisk et al. |
| 2012/0257583 A1 | 10/2012 | Keiser et al. |
| 2012/0262271 A1 | 10/2012 | Torgersrud et al. |
| 2012/0324244 A1 | 12/2012 | Zipperer et al. |
| 2013/0179949 A1 | 7/2013 | Shapiro |
| 2013/0252575 A1 | 9/2013 | Ewell et al. |
| 2014/0033230 A1 | 1/2014 | Hanna et al. |
| 2014/0215391 A1 | 7/2014 | Little et al. |
| 2014/0218466 A1* | 8/2014 | Bloms .................... G06Q 50/26 348/14.09 |
| 2014/0253663 A1 | 9/2014 | Edwards |
| 2014/0267547 A1 | 9/2014 | Torgersrud et al. |
| 2014/0270126 A1 | 9/2014 | Torgersrud et al. |
| 2014/0273929 A1 | 9/2014 | Torgersrud |
| 2014/0282898 A1 | 9/2014 | Torgersrud |
| 2015/0050910 A1 | 2/2015 | Torgersrud |
| 2015/0188925 A1 | 7/2015 | Gupta |
| 2015/0331881 A1 | 11/2015 | Myles |
| 2016/0192033 A1 | 6/2016 | Kitahara et al. |
| 2017/0272435 A1 | 9/2017 | Hodge |
| 2017/0272440 A1 | 9/2017 | Hodge |
| 2017/0324927 A1 | 11/2017 | Hodge |
| 2017/0324928 A1 | 11/2017 | Hodge |
| 2017/0324929 A1 | 11/2017 | Hodge |
| 2017/0324991 A1 | 11/2017 | Hodge |
| 2019/0222889 A1 | 7/2019 | Hodge |
| 2020/0336787 A1 | 10/2020 | Hodge |
| 2022/0174349 A1 | 6/2022 | Hodge |

OTHER PUBLICATIONS

DSKeye Gigabit Product Brief, Bitec Ltd. 2007; 2 pages.
Excerpt from Merriam-Webster's Collegiate Dictionary, Tenth Edition, 2002; p. 841.
Excerpt from The American Heritage Dictionary, 5th Ed. (2016); p. 679.
Excerpts from "iPhone: The Missing Manual," 6th ed., Sebastopol, CA: O'Reilly Media, 2012; 556 (submitted in 10 parts).
File History of U.S. Pat. No. 9,083,850, U.S. Appl. No. 13/931,857, filed Jul. 14, 2015.
Gotsopoulos et al., "Remote Controlled DSP Based Image Capturing and Processing System Featuring Two-Axis Motion, " Proceedings of the 4th European DSP in Education and Research Conference, Dec. 1-2, 2010; pp. 32-36.
International Search Report and Written Opinion directed to International Patent Appl. No. PCT/US2017/031317, mailed Aug. 2, 2017; 16 pages.
International Search Report and Written Opinion directed to International Patent Application No. PCT/US2017/022163, mailed Jun. 9, 2017; 12 pages.
Prosecution History of U.S. Pat. No. 8,929,525, U.S. Appl. No. 14/323,582, filed Jul. 3, 2014.
U.S. Appl. No. 61/801,861, filed Mar. 15, 2013; 77 pages.
Non-Final Office Action directed to U.S. Appl. No. 15/344,819, mailed Feb. 23, 2017; 7 pages.
Final Office Action directed to U.S. Appl. No. 15/344,819, mailed May 9, 2017; 9 pages.

\* cited by examiner

CONTROLLED ENVIRONMENT MEDIA AND COMMUNICATION SYSTEM

CROSS-REFERENCE TO RELATED APPLICATIONS

This application is a continuation of U.S. patent application Ser. No. 17/547,861, filed Dec. 10, 2021, which is a continuation of U.S. patent application Ser. No. 16/866,076, filed May 4, 2020, now U.S. Pat. No. 11,202,120 issued Dec. 14, 2021, which is a continuation of U.S. patent application Ser. No. 16/246,101, filed on Jan. 11, 2019, now U.S. Pat. No. 10,645,443 issued May 5, 2020, which is a continuation of U.S. patent application Ser. No. 15/603,095, filed on May 23, 2017, now U.S. Pat. No. 10,182,254 issued Jan. 15, 2019, which is a divisional of U.S. patent application Ser. No. 15/148,880, filed on May 6, 2016, now abandoned, which are incorporated by reference herein in their entireties.

BACKGROUND

Field

The disclosure relates to methods and systems for delivery of multimedia content and other communications services in secured facilities.

Background

American prisons house millions of individuals in controlled environments all over the country. The rights of these prisoners are largely restricted for a number of reasons, such as for their safety and the safety of others, the prevention of additional crimes, as well as simple punishment for crimes committed. However, these prisoners are still entitled to a number of amenities that vary depending on the nature of their crimes. Such amenities may include phone calls, commissary purchases, access to libraries, digital media streaming, as well as others.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
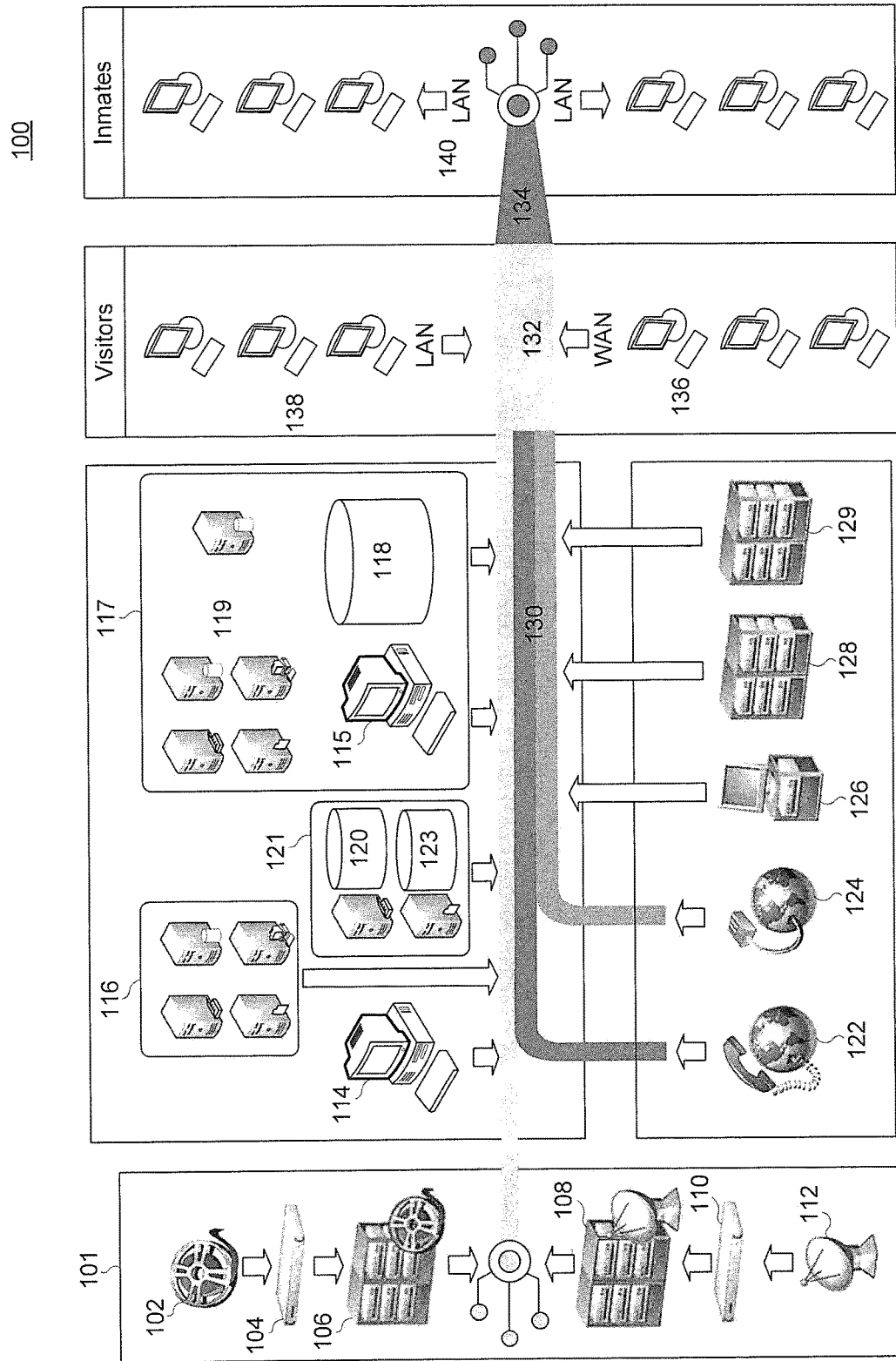
FIG. 1 is an overview of a controlled environment media and communication system according to an embodiment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

As discussed above, secured facilities endeavor to provide residents with an ever-growing capability for communication and entertainment. The Controlled Environment Media And Communication System IP-based platform offers significant advantages, including the ability to integrate television, local/network video/audio content, with other IP-based services like our offender messaging service, VOIP based voice telephone calling, VoIP or WebRTC based video conferencing, or future IP enhanced services as the jurisdictions needs dictate. The IP-based Controlled Environment Media And Communication System will be discussed in more detail below.

Network Architecture Overview

The Controlled Environment Media And Communication System 100 enables various communications services for residents of a controlled environment. In an embodiment, the controlled environment is a correctional institution such as a prison facility and the residents are inmates or otherwise incarcerated in the correctional institution. In other embodiments, the controlled environment may be any type of facility with a need to control and monitor content consumption such as a hospital, a dormitory, a mental health institution, a hotel, or other such facilities.

These types of controlled environments have unique requirements for communications and media distribution that are not present in other, non-controlled environments. First is the need to monitor and control access to communications pathways. Second, the authorities providing media to a controlled environment have a strong interest in censoring the types and subject matter of media content and communications sessions involving residents of the secured facility. Third, a controlled environment communication system operated by a controlled environment jurisdiction or authority must be cost efficient and have the capabilities to recover costs from residents for access to services. Finally, secured facilities have an incentive to provide communications services that are desirable to use and meet the needs of a large resident population. There may be other additional unique concerns and/or requirements in controlled environments that are not discussed here.

In a prison, the jurisdiction operating the prison has a strong interest in controlling the consumption and exposure to media and other content. For example, extremely violent media and content is not appropriate for a violent offender. In another example, some media content is associated with particular social movements or gang activity and may be deemed not appropriate for prisoner consumption. Even in the case of appropriate content, prison authorities may control access to media and content, for example as a reward for good behavior. In these ways, conventional media and communication systems do not address the unique needs and requirements of a system designed for controlled environments.

The Controlled Environment Media And Communication System 100 illustrated in FIG. 1 addresses these unique requirements and constraints imposed by the secured facility environment and further supports additional capabilities built on the network capabilities. Central to the Controlled Environment Media And Communication System 100 is Core Network 130. Core Network 130 connects all systems and services in Controlled Environment Media And Communication System 100. Core Network 130 is any suitable data networking system for transmitting data. In an embodiment, Core Network 130 is an Ethernet based network operating over twisted-pair type wires or coaxial-type wires. Core Network 130 comprises network switching capabilities, networking cabling, and network interfaces for all connected terminals and services. In an embodiment, Core Network 130 is a fiber-optic based network including fiber-optic cables, fiber-optic switches, and other fiber-optic type networking equipment. In another embodiment, Core Network 130 is a wireless radio frequency based network such as Wi-Fi™. In some embodiments, Core Network 130 comprises network segments of disparate technologies, such that some elements of Core Network 130 operate on different networking technology than other components. For example, Core Network 130 may include an Ethernet-based wired segment and a Wi-Fi™-based wireless segment that inter-operate to provide data connectivity and services.

There are several different levels of network access in a secured facility, just like there are several different levels of physical access in a secured facility. For example, in a prison secured facility, prison inmates are physically secured within one section of the facility. Another section of the facility may be physically accessible to prison staff and visitors, and finally members of the public may interact with the prison on the outer-most level of physical security, such as a mailman delivering mail. The same analogy holds true for network access within a secured facility.

The Core Network 130 contains subsections, or sub-parts that are segmented from one-another for security purposes. Core Network 130 may use networking technologies such as Virtual LAN ("VLAN"), network firewalls, Network Address Translation ("NAT"), or other network partitioning or segmenting techniques to create these subsections. Only network traffic approved by the jurisdiction operating the Core Network 130 is allowed to traverse network segments by using these techniques. In addition, network segments are physically separated from each other such that an unsecured network is not available in a secured physical location. For example, access to the outermost, least secured network layer is not available to inmates in their cells. Rather, devices in physically secured areas of the facility, such as a prison cell, are only exposed to the appropriate network segment for that secured area.

The most secured network segment is Access Network 134. Access Network 134 is the network segment that is available to the most secured locations in the secured facility. For example, Access Network 134 is the network available to inmates in prison cells in a prison secured facility. Next is Edge Network 132. Edge Network 132 is an intermediate network segment available to semi-secured areas of the secured facility such as areas for visitors. Next, Core Network 130 is available to the least-restrictive areas and facilities in the network. Finally, Core Network 130 is connected to one or more external networks, some of which may be a public network. In an embodiment, one external network is the Internet. In other embodiments, Core Network 130 can also interface with public networks other than the Internet as well.

The Controlled Environment Media And Communication System 100 includes Authentication Subsystem 129 which authenticates users on the network. In an embodiment, Authentication Subsystem 129 implements the Lightweight Directory Access Protocol (LDAP), providing integration capability with most currently existing authentication systems.

In an embodiment, Core Network 130 includes Class of Service ("CoS") administration features. The Core Network 130's Class of Service engine analyzes parameters of data packets to determine the types of payloads contained in the packets. Based on these identifiers, the Core Network 130 can implement Quality of service ("QoS") rules to shape traffic on the Core Network. For example, Core Network 130 may prioritize real-time video communications over simple file transfers to maintain a high quality of video. These features become even more important to the functioning of Core Network 130 when multiple services utilize the network such as media distribution, video visitation, and voice services.

User Interface Hardware and Software

Users interact with the Controlled Environment Media And Communication System 100 through a range of interfaces. In an embodiment, a kiosk format is used. One kiosk type is an inmate, or in-pod kiosk that is designed to be deployed in a controlled environment accessible to inmates or offenders. The Inmate Kiosk 200 includes computing resources and a range of input and output devices to facilitate communication with inmates. Inmate Kiosk 200 includes a CPU. The CPU includes a processor, storage, and memory for executing instructions to communicate with the Controlled Environment Media And Communication System 100. In an embodiment, the CPU runs a standard operating system such as Microsoft Windows™. In an another embodiment, the CPU runs a customized operating system. In an embodiment, the CPU executes instructions stored on storage local to the CPU, for example a hard drive or solid state drive. In an alternative embodiment, the CPU executes instructions stored on a network, for example by booting via PXE to load an operation system stored remotely. In an embodiment, Inmate Kiosk 200 communicates with Access Network 134.

For example, Inmate Kiosk 200 includes Input Devices 202 and 204. Input Device 202 is a keyboard. Input Device 204 is a trackball type input device. In alternative embodiments, other input devices may be substituted for those pictured, including mouse type input devices, touchscreen type input devices, touchpad type input devices, or the like. In an embodiment, Inmate Kiosk 200 also includes authorization input devices, such as Magnetic Card Reader 206. In alternative embodiments, Inmate Kiosk 200 includes any other kind of authorization input device, such as but not limited to biometric devices, a fingerprint reader, an iris scanner, a facial recognition camera, or an RFID reader. In an embodiment, Inmate Kiosk 200 includes Camera 208 for video communications, administrative supervision, or other uses. In an embodiment, Camera 208 is a three dimensional camera. In an embodiment, Inmate Kiosk 200 also includes Microphone Jack Input Connector 210. Monitor 212 is an LCD-type monitor, although any visual display can be used in alternative embodiments. Inmate Kiosk 200 also includes Speaker 216. Inmate Kiosk 200 includes Handset 214, including a microphone and speaker. In an embodiment, Inmate Kiosk 200 is compatible with functionality to enable communications to and from persons with hearing or speech difficulties. For example, Inmate Kiosk 200 may include support for standard TTY and TDD devices and protocols.

Inmate Kiosk 200 is housed in a hardened enclosure designed to withstand physical abuse and resist ingress or damage to the computing components inside. For example, Inmate Kiosk 200 can be enclosed in a primary stainless steel enclosure 218 of a think gauge. In addition, Monitor 212 is enclosed behind a protective covering, for example quarter-inch thick security glass. Input Devices 202-208 are similarly designed to be resistant to physical abuse or vandalism. Any openings on Kiosk 200 are able to be locked closed so that only authorized access is permitted. In some embodiments, Inmate Kiosk 200 includes a powered ventilation system to provide adequate ventilation for computing and networking components contained therein. For example, Inmate Kiosk 200 includes a vandalism-resistant fan opening to allow airflow to within the chassis.

In an embodiment, Inmate Kiosk 200 is designed to be accessible to all persons, including disabled persons in compliance with any applicable standard for accessibility to disabled persons. In an embodiment, Inmate Kiosk 200 is designed to be mounted on a wall. In an alternative embodiment, Inmate Kiosk 200 is designed to be pedestal mounted.

In an embodiment, inmates interact with the system through a tablet form-factor computer housed in a secure housing. Tablet Computer 302 includes a Touchscreen 304, Microphone 306, Speaker 310, and Audio Jack 308. Tablet Computer 302 is housed in a secure housing 312. In other embodiment, Tablet Computer 302 is not housed in a secure housing. In some embodiments, Tablet Computer 302 also includes a Camera 314. In an embodiment, Tablet Computer 302 operates similar or substantially the same software as Inmate Kiosk 200 such that all available services that are available on the Inmate Kiosk 200 are also available on Tablet Computer 302. Some examples below are illustrated in terms of Inmate Kiosk 200, but it is to be understood that Tablet Computer 302 could take the place of Inmate Kiosk 200 for any embodiment described herein.

Another kiosk type is a kiosk designed for use by visitors, or other non-inmate individuals. In an embodiment, the Visitor Kiosk 138 is deployed in common or visitation areas of a secured facility. In an embodiment, the Visitor Kiosk 138 is substantially similar to the Inmate Kiosk 200. In another embodiment, the Visitor Kiosk 138 is not required to be as vandalism-resistant as the Inmate Kiosk 200, and is not built to the same vandalism-resistant specification as the Inmate Kiosk 200. One key differentiator between Inmate Kiosk 200 and Visitor Kiosk 138 is that Visitor Kiosk 138 is connected to Edge Network 132, and Inmate Kiosk 200 is connected to Access Network 134. Similar to the Inmate Kiosk 200, Visitor Kiosk 138 may be embodied in different form factors, including a tablet computer.

In an embodiment, users interact with the Controlled Environment Media And Communication System 100 through a software client. The software client can be run on any client computing device, for example a smartphone, a laptop computer, a desktop computer, or a tablet computer, for example. In an embodiment, the software client is executed on a smartphone such as Smartphone 400. The software client is fully configurable by the jurisdiction operating the Controlled Environment Media And Communication System 100. In an embodiment, the operations of Visitor Kiosk 138 are fully encompassed by the software client operating on a visitor's own hardware.

Media Distribution

Controlled Environment Media And Communication System 100 provides distribution of media to users through the various access points, including for example Inmate Kiosk 200 through Media Subsystem 101. The Media Subsystem 101 provides support for both real-time and on-demand media, including video and audio. Examples of real-time media include broadcast television, broadcast radio, cable television, satellite television (i.e., Ku, Ka, or C-band), satellite radio, and live interne streaming of video and/or audio. Examples of on-demand media include video-on-demand (VOD), audio-on-demand, movie downloads, music downloads, pay-per-view video (PPV), and other such asynchronous media distribution methods. The Controlled Environment Media And Communication System 100 makes available any combination of real-time and on-demand media as required by the jurisdiction operating the secured facility.

Asynchronous video content is sourced from Media Source #102. In an embodiment, Media Source 102 is a third party cloud media provider. In another embodiment, Media Source 102 is a media repository integral to Media Subsystem 101. Media from Media Source 102 is encoded by Media Encoder 104. In an embodiment, video content is encoded with MPEG-2, MPEG-4, H.264, or any other suitable video CODEC. Similarly, audio content is encoded with any suitable audio CODEC including but not limited to MP3, AAC, or other audio CODEC.

Next, the encoded media is made available to consumers from Media Acquisition Server 106. Media Acquisition Server 106 stores encoded media from Media Source 102 for future consumption. Media Acquisition Server 106 maintains a catalog of media that is available to consumers. The media catalog is available to consumers to select media from Media Acquisition Server 106.

In an embodiment, Media Source 102 stores video or movie content and Media Acquisition Server 106 provides video-on-demand (VOD) services to consumers. In an embodiment, Media Source 102 stores audio or music content and Media Acquisition Server 106 provides music-on-demand services to consumers. In other embodiments, both video and audio media formats are handled by the same system and both media types are made available to consumers.

Broadcast media content is sourced from Broadcast Media Source 112. In an embodiment, Broadcast Media Source 112 is a publicly broadcast media signal, such as broadcast television or radio. In an embodiment, Broadcast Media Source 112 is a privately broadcast medium such as a private internet stream, satellite television, or satellite radio broadcast. In an embodiment, Broadcast Media Source 112 is a television or radio broadcast internal to the secured facility or a network of secured facilities. For example, a secured facility can operate an informational television broadcast that is only available to residents of the secured facility.

Media from Broadcast Media Source 112 is encoded by Broadcast Media Encoder 110. In an embodiment, video content is encoded with MPEG-2, MPEG-4, H.264, or any other suitable video CODEC. Similarly, audio content is encoded with any suitable audio CODEC including but not limited to MP3, AAC, or other audio CODEC.

Next, the encoded Broadcast media is made available to consumers, such as the inmates, from Broadcast Media Acquisition Server 108. Broadcast Media Acquisition Server 108 buffers encoded media from Broadcast Media Source 112 for consumption. Broadcast Media Acquisition Server 108 maintains a guide of broadcast media that is available to consumers. For example, a television guide indicating the channels available and the media broadcast on those channels is made available by Broadcast Media Acquisition Server 108. The media guide is available to consumers to select broadcast media from Broadcast Media Acquisition Server 108.

Media from both Media Acquisition Server 106 and Broadcast Media Acquisition Server 108 is delivered via the Core Network 130 to user hardware such as Inmate Kiosk 200 for consumption. In an embodiment, a Media Distribution Cluster 116 is interposed between the acquisition servers and the consumers. Media Distribution Cluster 116 operates as a cache or buffer to distribute load and relieve the acquisition servers. In an embodiment, Media Distribution Cluster 116 comprises individual servers that are disposed within closer physical proximity to the consumer such that overall network load is reduced.

In an embodiment, Core Network 130 supports multicast routing to reduce network load and increase bandwidth efficiency. Multicast routing enables Media Distribution Cluster 116 to send one stream of data to many clients such as Inmate Kiosk 200 at once, reducing the load on the network. In an embodiment, typical unicast networking is utilized where appropriate.

Media Subsystem 101 streams content to remote end users utilizing Unicast and Multicast TCP, UDP, or WebRTC connections depending on source content. Encoders 104 and 110 convert or transcode media from any source format to any consumption format necessary for end users. For example, some of the media formats used are MPEG-4, H.264, or VC-1 formats. In an embodiment, use of these formats enables distribution of standard-definition video ("SDTV") content with requirements of about 1 Mbps per stream and about 5 Mbps for high-definition video content ("HDTV").

In an embodiment, Encoders 104 and 110 are software based, and in another embodiment Encoders 104 and 110 are hardware-based. In another embodiment, a combination of both software and hardware are used to encode media in Encoders 144 and 110. In an embodiment, using advanced video compression and multicast routing, Media Subsystem 101 can achieve a virtually unlimited number of channels to a virtually unlimited number of users on the network. In an embodiment, over 1000 simultaneous channels is achievable.

Media Subsystem 101 can be administered either on premise or remotely. In an embodiment, the Media Subsystem 101 includes a remote administration module that enables content provision and management of Media Subsystem 101 from a remote location. All content distributed by Media Subsystem 101 is controlled by the system administrator utilizing a proprietary Class of Service administration.

In an embodiment, Media Subsystem 101 is designed to be fault tolerant. It is important that Media Subsystem 101 remain operational even in the event of an emergency to broadcast emergency messages. Thus, the Media Subsystem 101 can include redundant systems including redundant Media Acquisition Server 106, Broadcast Media Acquisition Server 108, Media Distribution Cluster 116, and all other components of Media Subsystem 101. Media Subsystem 101 includes automatic failover means to automatically remove inaccessible or otherwise unresponsive components out of the network and continue to provide services to the secured facility.

Video Visitation

Figure 2:
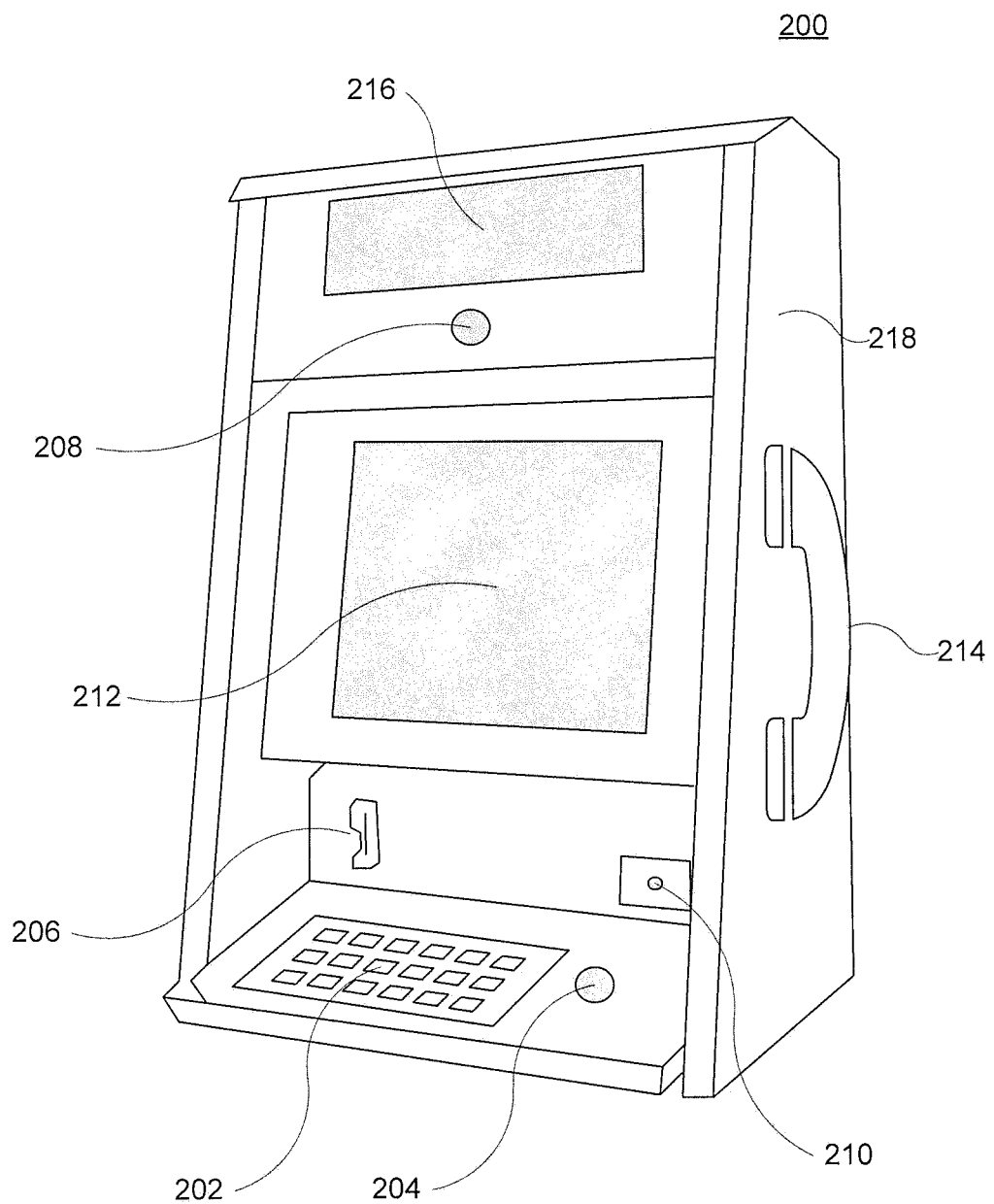
FIG. 2 is an illustration of an access kiosk according to an embodiment.
Figure 3:
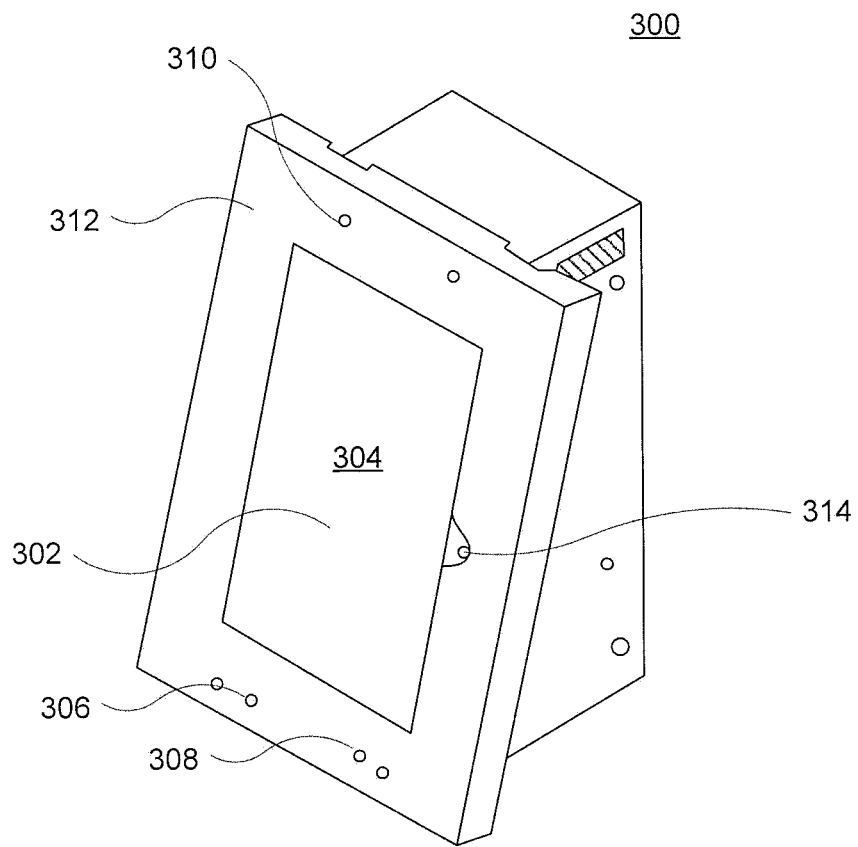
FIG. 3 is an illustration of an access kiosk according to an embodiment.
Figure 4:
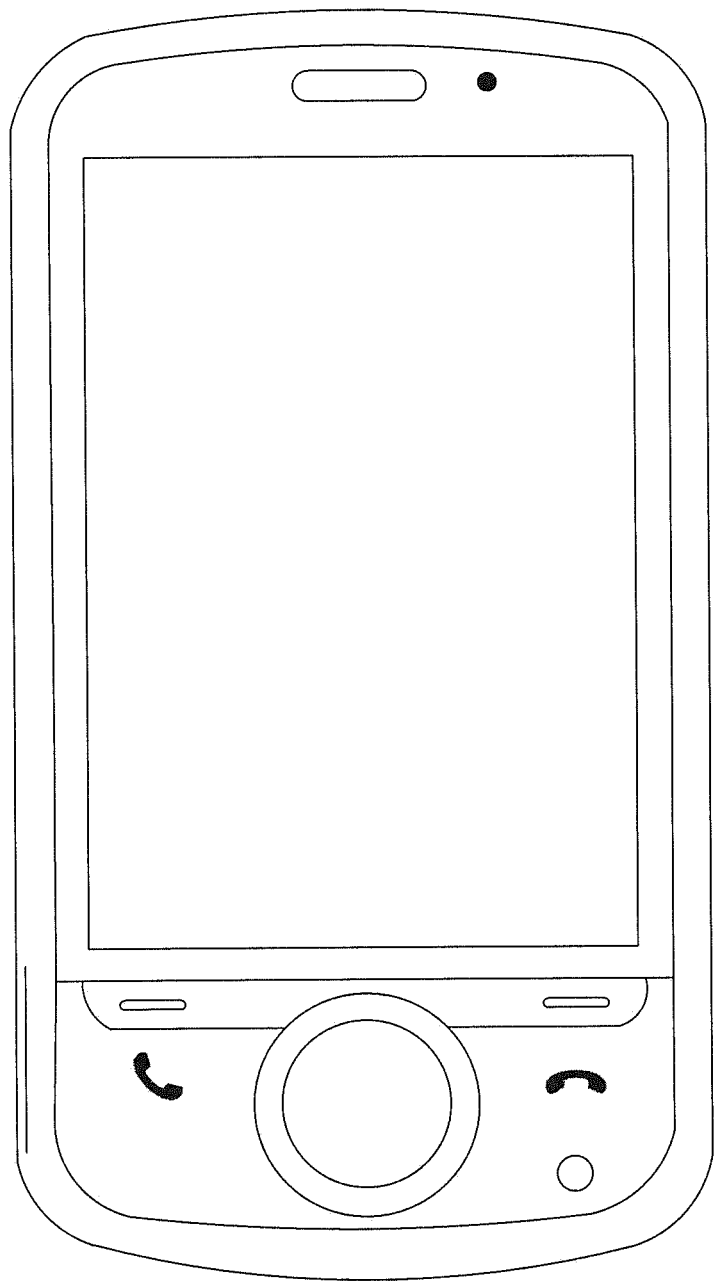
FIG. 4 is an illustration of an access kiosk according to an embodiment.

One aspect of the Controlled Environment Media And Communication System 100 is video visitation provided by Video Visitation Subsystem 117. Video visitation is the process of a bi-directional or unidirectional video communication between an inmate and a visitor such as family, friends, clergy, or the like. In an embodiment, Video Visitation Subsystem 117 enables video visitation through Inmate Kiosk 200 illustrated in FIG. 2. The Video Visitation Subsystem 117 makes use of Camera 208 in the Inmate Kiosk 200 and similar cameras in other hardware used to access the Controlled Environment Media And Communication System 100. In an embodiment, video visitation is supported between users on smartphones, tablet computers, inmate kiosks, and Visitor Kiosks 138. Other forms of video visitation include educational video visitation where an inmate can participate in a classroom via video feed.

The Video Visitation Subsystem 117 utilizes the Core Network 130 to route video visitation traffic between inmate kiosks and visitor kiosks. Local real-time video visitation can be broadcast using similar multicast techniques to reduce network traffic. For example, in an embodiment, an on premise classroom is broadcast throughout the secured facility using multicast routing to a plurality of inmate kiosks and inmate devices, delivering educational experiences to large amounts of inmates simultaneously while not significantly increasing network load. In an embodiment video transport uses IGMP version 2 for connecting to a multicast stream and the Real Time Streaming Protocol (RTSP) to deliver video content. Video content may be compressed with any known video compression codec, including but not limited to H.264, H.265, WebM, MPEG-4, MPEG-2, or the like. Likewise, video streams originating from the inmate hardware, including Inmate Kiosk 200 or Tablet Computer 302 are compressed using similar video coding techniques. In an embodiment, video compression and decompression is assisted in the Inmate Kiosk 200 by a graphical processing unit (GPU) co-processor.

A feature of the Video Visitation Subsystem 117 is the Video Visitation Investigative Unit 115. The Investigative Unit 115 performs real-time monitoring and storage of video visitations sessions for real-time and future review and analysis. Investigative Unit 115 allows investigators to view time-shifted video visitation feeds and pause, rewind, and fast-forward through video visitation sessions to efficiently and accurately analyze the content of the video visitation session. An investigative administrator is presented with the option to monitor any current video visitation feeds or to play archived video visitation sessions stored in Video Visitation Database 118.

Video visitation session properly flagged as being confidential, such as a meeting between an attorney and a client, will not be made available to investigative workstations and is not recorded into Video Visitation Database 118. In an embodiment, sessions marked as confidential can be identified through one or more criteria such as a scheduling identifier, a specified remote contact, or a specified local access point such as a specific kiosk within the facility.

Authorized users will have to ability to monitor visitation/encounter sessions in process. Although the inmate and called party are notified during the session setup that the session is recorded and subject to monitoring, actual live monitoring of a session are completely transparent to the parties.

Investigators using Video Visitation Investigative Unit 115 are able to perform monitoring of live sessions. In an embodiment, the Investigator is able to select whether to see every visitation/encounter kiosk or just the ones with active sessions. The user interface displays information regarding the location of the kiosk stations and the identity of the offender and the visiting party. To start live monitoring, the session, the user clicks an icon in a graphical user interface. This opens a new window displaying the both end's video sessions and the session audio, which is played over workstation speakers or headphones if desired. If the administration users determine that the session is inappropriate, they will be able to cut off the session and/or make notes to the session (such as a case number) that can be searched for and reviewed later.

While live monitoring (or pulling historical recordings), each users is able to add notes (see the user interface view below) to the session recording file. Investigators are able to select a specific portion of the recorded session to save as a separate file and add notes related to their findings.

At a later time, investigator users using Investigative Unit 115 are able to retrieve video visitation session recordings. In an embodiment, investigators with appropriate account privileges are able to retrieve session recordings by utilizing a graphical user interface. In the graphical user interface are multiple options for searching of session records including "quick searches" keyed on offender, visiting party, kiosk ID, or date/time bands. Ad-hoc queries on more complex criteria are also be able to be defined. Once the search is conducted and session records are displayed, the records can be ordered on the basis of any of the session record fields by selecting the field name on a display header bar.

Session recordings are available for playback at the user's discretion. Clicking an icon on the record will open a new window displaying the both end's video sessions and the session audio, which will be played over workstation speakers or headphones if desired. The window provides tools for control of the playback. While listening to or viewing a recording, the user may add notes to the session recording file. The user will also be able to select a pertinent portion of the recorded session, save it as a separate file, add notes related to his/her findings and archive the recorded conversation on a DVD.

In addition to recording capabilities, the Video Visitation Subsystem 117 provides a full array of administrative capabilities, including the ability to initiate and terminate individual or multiple sessions, as well as an audio barge-in feature if desired for visitation warnings of unacceptable behavior or language. This barge in-feature can be invoked from live session monitoring as described above. In conjunction with existing jurisdiction scheduling databases, the Video Visitation Subsystem 117 is capable of auto-initiating and terminating sessions per the scheduled time. Time limit warnings will be made available to all system users for them to be aware of impending session termination.

A Video Visitation Scheduling System 119 enables inmates and/or visitors to schedule a video visitation session. The Scheduling System 119 also optionally alerts investigative administrators to the scheduled video visitation so that the investigator can supervise the video visitation session. The Video Visitation Subsystem 117 allows the jurisdiction to control and or approve online scheduling. In addition, the authentication requirements, offender classification/designation, STG, or other jurisdiction may be designated by the jurisdiction from a Jail Management data feed or entry of the data into the system database. The Video Visitation Subsystem 117 also provides for he online scheduling of video visitation which would allow approved visitors to schedule visits according to jurisdiction visiting regulations.

In an embodiment, Video Visitation Subsystem 117 is compatible with industry standards such as H.320. H.320 is an umbrella recommendation by the ITU-T for running Multimedia (Audio/Video/Data) over ISDN based networks. Video Visitation Subsystem 117 can utilize bandwidth saving MPEG-4, H.264, or VC-1 formats for internal communication between Inmate Kiosk 200 and Visitor Kiosk 138, for example. For video visitation with a remote video visitation user, Video Visitation Subsystem 117 can use H.320 standards, for example. An example of a H.320 video visitation session is a minimum resolutions of 352×288 pixels at 30 frames per second with minimum bandwidth requirements up to 1.544 Mbps per session as per H.320 standards. In an embodiment, Video Visitation Subsystem 117 utilizes WebRTC standards to communicate with remote video visitation participants. Other such standards, formats, and processes as known in the video communication arts can also be implemented as protocols in Video Visitation Subsystem 117.

Intra-Facility Communication

In addition to media services and video visitation services, Controlled Environment Media And Communication System 100 enables communication between controlled environment residents and the jurisdiction operating the controlled facility via Intra-Facility Communication Subsystem 121. One form of communication is a complaint or request, commonly referred to as a 'kite' in the correctional industry. A kite is a written request, complaint, or other communication from an inmate to facility staff and administrators. Examples of kites are requests to see a doctor, a question posed to a counselor, or other communications to facility staff.

The Inmate Kiosk 200 supports input and sending of a kite message. In an embodiment, a kite message includes an inmate's name, an identifying number associated with the inmate, the date the kite message is entered, the department the message is to be routed to, and the individual staff member the message is directed to. In other embodiments, a kite message contains only a subset of these fields. The inmate is able to input the data for a kite message via the Inmate Kiosk 200 using any combination of input devices attached to or integral to Inmate Kiosk 200 such as a keyboard and mouse. In other embodiments where the inmates use a tablet computer to access the Controlled Environment Media And Communication System 100, the inmate inputs data for a kite message via a touchscreen. In an embodiment, some of the fields are presented as a drop-down menu in which the inmate entering in data can select a data value. For example, the department field may be a drown-down type input field with the options "Health," "Services," "Canteen," "Unit Manager," etc. Selecting the appropriate entry routes the kite message to the associated department within the secured facility. In an embodiment, the inmate is also allowed to flag a kite message with a priority indicator. Priority indicators include but are not limited to low priority, normal priority, high priority, or emergency priority. By indicating the appropriate level of priority, facility staff are able to service all inmate and resident needs more efficiently. After entering in data for all necessary fields, the inmate submits the kite message from the Inmate Kiosk by hitting a "send" button or the equivalent graphical user interface element.

The graphical user interface for generating kite messages also includes a frequently asked questions section where simple or oft-encountered kite requests can be addressed without the need to submit a kite request message. The purpose of the frequently asked questions format is to provide answers quickly and efficiently. The frequently asked questions can also be directed to the kite message submission process as well, such as information regarding who will process the kite message and when to expect a response.

Once a kite message is generated and submitted from an inmate by, for example, an Inmate Kiosk 200, the message is sent to the Intra-Facility Communication Subsystem 121. Received kite messages are stored in Kite Message Database 120. In an embodiment, Kite Message Database 120 is a relational database, for example an SQL database. In another embodiment, Kite Message Database 120 is a non-relational document store.

Intra-Facility Communication Subsystem 121 then validates the kite message upon receipt. One validation step is to flag kite messages containing certain keywords and phrases. For example, keywords related to gangs, drugs, profanity, sexually explicit words, and other such topics are filtered and flagged for review by an appropriate administrator. The keywords and phrases are stored in Censorship Database 123. Censorship Database 123 can be updated at any time to include new words or phrases to search new incoming messages for. In addition, a search function allows administrators to search previously submitted kite messages in Kite Message Database 120 for keywords and phrases in the Censorship Database 123. An alert message can also be set to inform system administrators when a kite message containing certain keywords or phrases is submitted.

Another validation step is to disallow repetitive, duplicative, or otherwise abusive requests. In one embodiment, this filtering step is a rate-limiting step wherein inmates are disallowed from sending more than a set number of kite messages in a given time period. The rate-limiter can apply to all messages sent by an inmate, or can be specific to each recipient. For example, the rate limiter can be set to disallow more than 1 kite message to be sent to any given recipient each day. This prevents abuse of the Intra-Facility Communication Subsystem 121. Another validation step is to reject identical or substantially similar kite messages. Intra-Facility Communication Subsystem 121 searches the Kite Message Database 120 for similar or substantially similar messages submitted by the same inmate to the same recipient and disallows duplicates. This is also a mechanism by which inmates can be prevented from overwhelming the Intra-Facility Communication Subsystem 121. Any other appropriate algorithm or limitation can be set on the submission of kite messages by inmates to maintain a useful system that is not able to be abused. In an embodiment, the rate limitations are dynamically set on an individual basis so that repeat kite message abusers are subject to stricter limitations. In an embodiment, rather than simply disallowing repetitive or duplicative messages, the Intra-Facility Communication Subsystem 121 can flag such messages and inmates for disciplinary action by the facility staff.

Next, the kite message is routed to the appropriate department or individual for processing. A feature of the Intra-Facility Communication Subsystem 121 is that each message is tracked through its lifecycle, from creation, opening, reading, responding, taking action, and closing. These events are stored along with the original kite message in Kite Message Database 120. For example, when an administrator first opens a new kite message, that administrator's identification and a timestamp is recorded along with the kite message to indicate that the message was read. Next, when a kite message is acted upon, for example an appointment with a doctor was scheduled, that action is also recorded along with identifiers and timestamps along with the kite message.

In an embodiment, facility staff who act on kite messages are required to electronically sign the kite message to document the interaction. System administrators can also register alerts to be generated at the occurrence of any event associated with a kite message. For example, a medical department head can set an alert for any kite message acted upon by any staff members of the medical unit. Staff members are able to forward a kite message to another staff member for further action.

Intra-Facility Communication Subsystem 121 enforces privacy and confidentiality of kite requests as set by the system administrator. Only those staff members and administrators authorized to view, edit, act on, or close kite messages are allowed to take such actions.

In an embodiment, any staff member that can act on a kite message can also add notes or annotations to the kite message for reference. These annotations are viewable only by the staff members and are for administrative purposes.

For example, a note about an inmate's behavior, gang affiliation, or other information may be appropriate in certain situations. These annotations are also stored in Kite Message Database 120 along with the kite message. Notes and annotations may be in the form of text, images, or other records or data that is pertinent to the kite request.

Throughout the lifecycle of a kite message, inmate can view the status and any updates on their kite request through Inmate Kiosk 200. In an embodiment, the inmate is presented with a graphical representation of their kite messages and requests, who is addressing their kite message, and what action has been taken. Through this interface, inmates are able to cancel, amend, or append new information to a kite request to reflect changing circumstances. In this way, the Intra-Facility Communication Subsystem 121 enables a task-oriented two-way communications channel between inmates and facility staff. Staff members are also able to escalate a kite message request in the event that a higher authority is required to act on the kite message request.

Kite request messages may have an expiration data set by the inmate, a staff member, or automatically based on request type as defined by the jurisdiction operations the Intra-Facility Communication Subsystem 121. When an expiration date is reached the kite message is automatically closed by the Intra-Facility Communication Subsystem 121.

In an embodiment, Intra-Facility Communication Subsystem 121 can charge inmates for specific events associated with a kite message. For example, an institution can charge an inmate account for a medical visit or for a superfluous or duplicative request that burdens the administrative staff of the facility. If a staff member determines a charge should be levied upon the submitting inmate, that charge can be indicated in the Kite Message Database 120. In an embodiment, inmates are charged for repetitive or duplicative kite messages as detected in the validation described above. A separate billing and accounting process then makes sure the charge is properly paid and settled for the services or other functions performed.

Intra-Facility Communication Subsystem 121 also provides a robust investigation and analysis platform on which to examine kite messages stored in Kite Message Database 120. These analytics can provide valuable insight into the inner workings of a secured facility for facility administrators. For example, if a number of complaints are received about the same topic, facility administrators can address that topic. In this way, the kite system can act as a kind of suggestion box for facility administrators. In an embodiment, administrators are able to search past kite messages by key word, department, inmate, recipient, or any other data field or combination of data fields stored in Kite Message Database 120. Searches can be run one time, or stored to periodically generate reports for particular search queries. One example of a stored query is a query that outputs a list of similar kite messages received within a period of time from different inmates or residents. For example, if a number of inmates all submit kite messages identifying that there is a rodent infestation in the facility, administration will be notified immediately so that the problem can be rectified in a timely fashion.

In an embodiment, Intra-Facility Communication Subsystem 121 interfaces with a legacy system already in place at the secured facility. Several levels of interfacing with legacy systems are possible. First, the Intra-Facility Communication Subsystem 121 can import archived data into Intra-Facility Communication Subsystem 121 for analysis and archiving. Second, Intra-Facility Communication Subsystem 121 can co-exist with an existing data entry system that is already in place, such that Intra-Facility Communication Subsystem 121 imports data from another source for processing and analysis. Third, Intra-Facility Communication Subsystem 121 can integrate with a legacy analysis and processing backend while using the Inmate Kiosk and other kite message input methods described herein. In any level of integration, the administration operating the secured facility is able to choose an optimal integration strategy to work with legacy systems.

Intra-Facility Communication Subsystem 121 includes a data export and import feature for integration with legacy systems and other system. In an embodiment, Intra-Facility Communication Subsystem 121 is able to export and import kite message data in standard data formats. For example, in an embodiment, Intra-Facility Communication Subsystem 121 can export and import kite messages in a comma separated value list for interfacing with any external system that can accept a comma separated list. Other formats may be used in other embodiments, such as but not limited to XML, JSON, HTML, database formats, spreadsheet formats, and the like.

Other Inmate Communications Services

In some embodiments, Controlled Environment Media And Communication System 100 facilitates other communications services to and from inmates and other secured-facility residents. One example of other communications services is Voice Service 122. Voice Service 122 enables bi-directional voice calling to and from the Inmate Kiosk 200 using VOIP protocols utilizing the same Core Network 130 as the other communications described herein.

Another example of other services are Data Services 124. Data Services 124 enable arbitrary data to be sent to and broadcast from the Inmate Kiosk 200. Examples of data that Data Services supports are news stories, news video clips, weather forecasts, live TV guides, video-on-demand directories, and other such data that is of interest to inmates within a secured facility.

The Controlled Environment Media And Communication System 100 also includes Emergency Alert System 126. Emergency Alert System 126 provides jurisdiction system administrators with a barge-in capability of both video and/or audio which will override any and all current content consumption. For example, an inmate watching VOD or broadcast television content will be interrupted by Emergency Alert System 126 in the event of an emergency. Emergency Alert System 126 will then display the emergency alert message on the screen and also audibly announce the emergency. In an embodiment, Emergency Alert System 126 utilizes wake-on-Lan ("WoL") capabilities of client devices to activate non-active systems to broadcast the emergency message. The WoL capabilities can only be triggered by authorized administrative personnel.

Administrative Services

Administrative Workstation 114 has connectivity to Core Network 130. Administrative staff of the secured facility can operate Administrative Workstation 114 to manage all services offered on Core Network 130 within the facility. One function of Administrative Workstation 114 is to manage media content distribution. For example, different bundles of media content can be provided to users based on the needs of the secured facility and user preferences.

Administrative Workstation 114 also provides comprehensive real-time reporting capabilities which enable facility providers to manage their prison more effectively. One such report is a report of revenues, expenses, transactions, and other financial information and records associated with the provision of communications services described herein.

In an embodiment, the Administrative Workstation 114 offers real-time reporting of all media being consumed by inmates and other residents. This functionality is useful for facility providers who want to conduct inmate-metric analyses or evaluate the viewer demand for a particular channel, program, or content.

In an embodiment, the Administrative Workstation 114 offers interactive inmate surveys which enables content facility providers to collect information from inmates while they watch their favorite TV channels, program, or content. Survey questions can be defined in either closed-ended (multiple choice) or open-ended (no preset answer) formats. The survey functionality is attractive for service facility providers who want to conduct marketing research or measure results from advertising campaigns in real-time.

In an embodiment, Administrative Workstation 114 provides system administrators with several cut-off/control mechanisms to control communications on the system. The cut-off allows the administrator to terminate individual kiosk services or all kiosk functions for individual, groups, or all kiosks simultaneously. In addition, administrators can take control of individual functions of the kiosk to support users or initiate investigative monitoring utilizing the hardware and software functions for example use the microphone and camera to monitor activity near the kiosk or use the speaker or display to instruct the inmate.

In an embodiment, more fine-grained controls are also available to system administrators via Administrative Workstation 114. For example, administrators can regulate access to the Media Subsystem 101 through a class of service ("COS") database. Users on interface endpoint such as Inmate Kiosk 200 can be grouped together by living unit, offender type, or individually. Each communication service offered by the Controlled Environment Media And Communication System 100 is controlled individually. For example, Media Subsystem 101 controls include fine-grained controls of which channels or media sources are available to a particular inmate, and the time of day those sources are available. Again, these controls can be applied individually or by any grouping of inmates.

In an embodiment, the Administrative Workstation 114 includes or duplicates all capabilities of Video Visitation Investigative Unit 115. Again, these capabilities are applicable to users on interface endpoint such as Inmate Kiosk 200 and can be grouped together by living unit, offender type, or individually.

Billing

Billing Subsystem 128 handles billing for media distribution, video visitation, and all other communication services offered by Controlled Environment Media And Communication System 100. In an embodiment, Billing Subsystem 128 is centralized and shared among all other subsystems and components of Controlled Environment Media And Communication System 100. In another embodiment, Billing Subsystem 128 comprises multiple components tailored to each other subsystem and unique to that subsystem. In all embodiments, Billing Subsystem 128 offers methods of billing residents, inmates, outside parties, and all other users of Controlled Environment Media And Communication System 100 for the communication services rendered. For example, with respect to Media Subsystem 101, the Billing Subsystem 128 handles charging inmates and residents for delivery of media content. With respect to Video Visitation Subsystem 117, Billing Subsystem 128 charges residents, inmates, and/or outside parties appropriately for video visitation services.

In an embodiment, Billing Subsystem 128 performs real-time billing which reduces the risk of uncollectible accounts. To also reduce the chance of uncollectible accounts, Billing Subsystem 128 utilizes Authentication Subsystem 129 to authenticate users by any method available to Authentication Subsystem 129 such as biometric authentication, RFID authentication, Personal Identification Number entry, or multiples of the aforementioned.

In an embodiment, Billing Subsystem 128 supports both pre-paid and post-paid content billing, which provides extra flexibility for content facility providers. The pre-paid billing option reduces the risk of uncollectible accounts which enables facility providers to offer services on a global scale. The Billing Subsystem 128 bills all content requests in real-time to ensure that services are provided only to inmates with sufficient account balances.

In an embodiment, Billing Subsystem 128 charges a Debit Account. The resident can load funds onto the Debit Account in person, for example at a commissary, by electronic means, or by telephone. Funds can be added to the Debit Account from cash, bank accounts, or credit card accounts. Optionally, non-residents of the secured facility can be allowed to add funds to the resident's Debit Account as well.

As another form of payment, an Advance Pay Account can also be charged by Billing Subsystem 128. The Advance Pay Account can be funded by family and friends, and used for call fees associated with the resident. As with the Debit Account, the Billing Subsystem 128 can access the Advance Pay Account to determine that there are sufficient funds, when content is purchased.

In an embodiment, the Billing Subsystem 128 does not immediately deduct funds from an account, but accumulates usage over a billing cycle and forwards a bill to the resident at the end of the billing cycle. Parameters such as the length of the billing cycle, the total amount allowed to be billed during one billing cycle, and the forms of payment that the bill can be paid in can be adjusted to suit the needs of a particular secured facility.

Operation

In operation, a user, such as an inmate, logs into the Controlled Environment Media And Communication System 100 through hardware and/or software such as the Inmate Kiosk 200. In an embodiment, the user is presented with a graphical user interface that prompts the user for authentication. In an embodiment, the authentication consists of a user identification and a password. In other embodiments, other authentication mechanisms can be used. For example, biometric, fingerprint, facial recognition, hand geometry, voice print, 3D facial recognition, radio frequency identification, or combinations or other such personal authentication means can be used.

In an embodiment, the user, such as an inmate, uses a graphical user interface and a menu system to select communications services to utilize or consume through the Inmate Kiosk 200. Channel selection will be accomplished by using the mouse to scroll and click a selection or the keyboard up/down arrows and enter key. Touch screen controls are available for hardware systems, such as tablets and smart portable devices. The inmate can also utilize the menu system to invoke the Video Visitation Subsystem 117 and the Intra-Facility Communication Subsystem 121 as well.

During use, the Inmate Kiosk 200 can optionally provide the user with the ability to minimize the picture of playing media to a smaller frame to allow multiple window viewing to the offender simultaneously while maintaining its aspect ratio. This allows offenders to perform functions such as offender email while viewing TV.

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A communication platform for providing a video visitation session to an inmate of a controlled environment facility, the communication platform comprising:
   a communication interface configured to communicate with a plurality of video visitation terminals;
   a memory that stores recordings of video visitation sessions; and
   one or more processors configured to:
      receive a video communication from one of the plurality of video visitation terminals;
      identify a communication participant with which the inmate is communicating;
      obtain an identifier, from the video communication, that identifies one of the plurality of video visitation terminals used for the video communication;
      determine whether the video communication should be treated as confidential based on the identifier;
      record the video communication in response to determining that the video communication should not be treated as confidential; and
      decline to record the video communication in response to determining that the video communication should be treated as confidential.

2. The communication platform of claim 1, wherein the one or more processors are further configured to:
   access video visitation scheduling information in response to receiving a video visitation; and
   identify whether the video visitation identified in the visitation scheduling information is identified as confidential,
   wherein the determining is based on the identifying.

3. The communication platform of claim 1, wherein the one or more processors are further configured to identify an inmate and an outside party participating in the video communication.

4. The communication platform of claim 3, wherein the determining is based on at least one of the identified inmate or the identified outside party.

5. The communication platform of claim 1, wherein the one or more processors are further configured to make the video communication unavailable to a reviewer and an automated review system in response to determining that the video communication is confidential.

6. A method for providing a video visitation session to an inmate of a controlled environment facility, the method comprising:
   receiving a video communication from one of a plurality of video visitation terminals;
   identifying a communication participant with which the inmate is communicating;
   obtaining an identifier, from the video communication, that identifies the one of the plurality of video visitation terminals used for the video communication;
   determining whether the video communication should be treated as confidential based on the identifier;
   recording the video communication in response to determining that the video communication should not be treated as confidential; and
   declining to record the video communication in response to determining that the video communication should be treated as confidential.

7. The method of claim 6, further comprising:
   accessing video visitation scheduling information in response to receiving a video visitation; and
   identifying whether the video visitation identified in the visitation scheduling information is identified as confidential,
   wherein the determining is based on the identifying.

8. The method of claim 6, further comprising identifying an inmate and an outside party participating in the video communication.

9. The method of claim 8, wherein the determining is based on at least one of the identified inmate or the identified outside party.

10. The method of claim 6, further comprising making the video communication unavailable to a reviewer and an automated review system in response to determining that the video communication is confidential.

11. A video visitation monitoring device, comprising:
    a memory; and
    one or more processors configured to:
       receive a video communication from one of a plurality of video visitation terminals;
       identify a communication participant with which an inmate is communicating;
       obtain an identifier, from the video communication, that identifies the one of the plurality of video visitation terminals used for the video communication;
       determine whether the video communication should be treated as confidential based on the identifier;
       record the video communication in response to determining that the video communication should not be treated as confidential; and
       decline to record the video communication in response to determining that the video communication should be treated as confidential.

12. The video visitation monitoring device of claim 11, wherein the one or more processors are further configured to:
    access video visitation scheduling information in response to receiving a video visitation; and
    identify whether the video visitation identified in the visitation scheduling information is identified as confidential,
    wherein the determining is based on the identifying.

13. The video visitation monitoring device of claim 11, wherein the one or more processors are further configured to identify an inmate and an outside party participating in the video communication.

14. The video visitation monitoring device of claim 13, wherein the determining is based on at least one of the identified inmate or the identified outside party.

* * * * *